United States Patent
Ronda et al.

(10) Patent No.: US 10,018,735 B2
(45) Date of Patent: Jul. 10, 2018

(54) $CE^{3+}$ ACTIVATED LUMINESCENT COMPOSITIONS FOR APPLICATION IN IMAGING SYSTEMS

(71) Applicant: KONINKLIJKE PHILIPS N.V., Eindhoven (NL)

(72) Inventors: Cornelis Reinder Ronda, Aachen (DE); Georg Greuel, Roetgen (DE); Thomas Justel, Witten (DE); Benjamin Herden, Aachen (DE); Tim Koecklar, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 274 days.

(21) Appl. No.: 14/903,640

(22) PCT Filed: Jul. 17, 2014

(86) PCT No.: PCT/IB2014/063166
§ 371 (c)(1),
(2) Date: Jan. 8, 2016

(87) PCT Pub. No.: WO2015/008241
PCT Pub. Date: Jan. 22, 2015

(65) Prior Publication Data
US 2016/0146950 A1  May 26, 2016

Related U.S. Application Data

(60) Provisional application No. 61/847,101, filed on Jul. 17, 2013.

(51) Int. Cl.
*G01T 1/202* (2006.01)
*C09K 11/77* (2006.01)

(52) U.S. Cl.
CPC ........ *G01T 1/2023* (2013.01); *C09K 11/7773* (2013.01)

(58) Field of Classification Search
CPC ....... G01T 1/2023; G01T 1/20; G01T 1/2006; G01T 1/2008; G01T 1/2012; G01T 1/2018; C09K 11/7773
See application file for complete search history.

(56) References Cited

U.S. PATENT DOCUMENTS

| | | |
|---|---|---|
| 4,647,781 A | 3/1987 | Takagi |
| 5,015,860 A | 5/1991 | Moses |

(Continued)

FOREIGN PATENT DOCUMENTS

| | | |
|---|---|---|
| EP | 1291676 | 3/2003 |
| JP | 6130199 | 5/1994 |
| JP | 2012121781 | 6/2012 |

OTHER PUBLICATIONS

Spijker, "Luminescence and scintillation properties of BaY2F8:Ce3+, BaLu2F8 and BaLu2F8:Ce3+", Journal of Luminescence, vol. 85, No. 1-3, Dec. 1, 1999.

(Continued)

*Primary Examiner* — David Porta
*Assistant Examiner* — Djura Malevic (57) ABSTRACT

A luminescent composition includes a host matrix sensitized by $Ce^{3+}$ and showing emission in the ultraviolet range. Typical host matrices include fluorides, sulphates, and phosphates, in particular $A(Y_{1-x-y}Lu_xLa_y)F_4$, $A(Y_{1-x-y}Lu_xLa_y)_3F_{10}$, $BaCa(Y_{1-x-y}Lu_xLa_y)_2F_{10}$, and $Ba(Y_{1-x-y}Lu_xLa_y)_2F_8$, wherein A=Li, Na, K, Rb, or Cs. One or more of these luminescent compositions may be applied as a ceramic or single crystalline converter for CT, PET or SPECT scanners, or as a luminescent powder layer for x-ray intensifying screens.

16 Claims, 12 Drawing Sheets

(56) References Cited

U.S. PATENT DOCUMENTS

| | | | |
|---|---|---|---|
| 5,483,062 A | 1/1996 | Czirr | |
| 7,405,404 B1* | 7/2008 | Shah | C09K 11/7719 250/361 R |
| 7,547,888 B2 | 6/2009 | Cooke | |
| 7,608,201 B2* | 10/2009 | Iltis | C30B 11/00 117/940 |
| 7,655,919 B1* | 2/2010 | Shah | G01T 1/202 250/370.11 |
| 7,670,578 B2* | 3/2010 | Iltis | C04B 35/5152 423/263 |
| 7,755,054 B1* | 7/2010 | Shah | C09K 11/7772 250/361 R |
| 7,847,262 B1* | 12/2010 | Shah | G01T 1/202 250/370.11 |
| 7,863,572 B1* | 1/2011 | Doty | G01T 1/2023 250/361 R |
| 8,153,983 B1* | 4/2012 | Shah | G01T 1/202 250/361 R |
| 8,299,436 B2 | 10/2012 | Srivastava | |
| 8,575,553 B1* | 11/2013 | Shah | G21K 4/00 250/361 R |
| 9,334,444 B1* | 5/2016 | Yang | C09K 11/7773 |
| 9,561,969 B2* | 2/2017 | Wei | C30B 29/12 |
| 2005/0061982 A1* | 3/2005 | Ichinose | G01T 1/2023 250/361 R |
| 2006/0121293 A1 | 6/2006 | Boutwell | |
| 2008/0213151 A1 | 9/2008 | Yoshikawa | |
| 2009/0140153 A1* | 6/2009 | Flamanc | G01T 1/2018 250/368 |
| 2010/0264322 A1* | 10/2010 | Levene | G01T 1/2018 250/367 |
| 2010/0314550 A1 | 12/2010 | Yoshikawa | |
| 2011/0024635 A1* | 2/2011 | Shah | G01T 1/202 250/362 |
| 2013/0058452 A1* | 3/2013 | Levene | G01T 1/2018 378/19 |
| 2013/0126741 A1* | 5/2013 | Srivastava | C09K 11/7773 250/362 |

OTHER PUBLICATIONS

Zhu, "Facile synthesis and luminescence properties of uniform and monodisperse KY3F10:Ln3+ (Ln=Eu, Ce, Tb) nanospheres", Journal of Luminescence, vol. 131, No. 7, Mar. 12, 2011.

Ueno, et al., "High-Temperature water vapor corrosion behavior of Lu4Hf3O12 phase", Ceramics International Jul. 2, 2003.

* cited by examiner

CE³⁺ ACTIVATED LUMINESCENT COMPOSITIONS FOR APPLICATION IN IMAGING SYSTEMS

CROSS REFERENCE TO RELATED APPLICATIONS

This application is a national filing of PCT application Serial No. PCT/IB2014/063166, filed Jul. 17, 2014, published as WO 2015/008241 on Jan. 22, 2015, which claims the benefit of U.S. Provisional Application No. 61/847,101 filed Jul. 17, 2013, which is incorporated herein by reference.

The present application relates generally to the imaging arts and more particularly to luminescent compositions for use in imaging systems. The application subject matter finds use in many kinds of imaging systems, including for example computed tomography (CT) imaging systems, positron emission tomography (PET) imaging systems, and single-photon emission computed tomography (SPECT) systems. It could also be used in connection with other imaging systems, for example as part of an x-ray intensifying screen.

Luminescent compositions function to harness the energy of incoming high energy radiation photons (e.g. x-rays or gamma rays) and transform that energy to secondary radiation photons (e.g. ultraviolet light) which can more easily be measured by electronic photodetectors such as a photodiode or photomultiplier. Each such transformation is called a scintillation event. The photodetector produces electrical signals indicative of the intensity of the secondary radiation. In a typical application, an imaging detector array includes several pixels, with each pixel formed by one or more blocks of a scintillating luminescent composition material optically coupled to a photodetector.

The performance of a scintillating luminescent composition material depends on many properties of the material, including for example its stopping power, brightness, and decay time. Ever since the discovery of x-rays by Wilhelm Conrad Roentgen in 1895 there has been an ongoing need to find and develop materials which are efficient in converting higher energy photons into lower energy photons. A wide variety of such scintillating materials have been investigated and used. Commonly used scintillating luminescent compositions for x-ray detection include for example $Ce^{3+}$ doped inorganic host matrices such as $Lu_2SiO_5$, $LuPO_4$, and $Lu_2Si_2O_7$, all of which have a high density which provides an advantageously high stopping power with respect to the incoming x-ray radiation.

Nonetheless, novel luminescent compositions are still of high interest, especially if their density or light yield is high, or if their rise and decay times are short. Regarding decay times in particular, a luminescent composition's decay time corresponds to the time it takes for the secondary scintillation light afterglow to fall back down to practically zero or to some other minimum value. Generally speaking, it is desirable to reduce a luminescent composition's decay time. Shorter decay times lead to a shorter imaging time, as well as a higher resolution in the imaging data. Similarly, an afterglow having a narrower wavelength spectrum is preferred to an afterglow having a broader wavelength spectrum. A smaller afterglow is advantageous because it increases the number of scintillation events which may be detected in a given time period, and also increases the temporal resolution of the detector. For these and other reasons the decay time is an essential performance figure of a respective luminescent composition, and shortening of the decay time yields advantages for the application.

The present disclosure relates to luminescent compositions sensitized by $Ce^{3+}$, and in particular to such luminescent compositions in which $Ce^{3+}$ shows emission in the ultraviolet range. "Ultraviolet" light as defined herein corresponds to light having a wavelength between about 280 nm and about 400 nm. These luminescent compositions include for example scintillating compositions in which $Ce^{3+}$ is located on crystallographic sites exerting a low crystal-field splitting and a low covalent interaction with the activator. Typical examples are fluorides, sulphates, and phosphates, in particular the following fluorides:

$A(Y_{1-x-y}Lu_xLa_y)F_4$,
$A(Y_{1-x-y}Lu_xLa_y)_3F_{10}$,
$BaCa(Y_{1-x-y}Lu_xLa_y)_2F_{10}$, and
$Ba(Y_{1-x-y}Lu_xLa_y)_2F_8$, wherein A=Li, Na, K, Rb, Cs, or solid solution combinations thereof. The present disclosure also concerns the application of one or several of these luminescent compositions as a ceramic or single crystalline converter for CT imaging scanners, or PET or SPECT imaging scanners. This disclosure further concerns the application of one or several of these luminescent compositions in a luminescent powder layer for x-ray intensifying screens.

Numerous additional advantages and benefits will become apparent to those of ordinary skill in the art upon reading the following detailed description of the preferred embodiments. The invention may take form in various chemical compositions, various components and arrangements of components, and in various process operations and arrangements of process operations. The drawings are only for the purpose of illustrating preferred embodiments and are not to be construed as limiting the invention.

Figure 1:
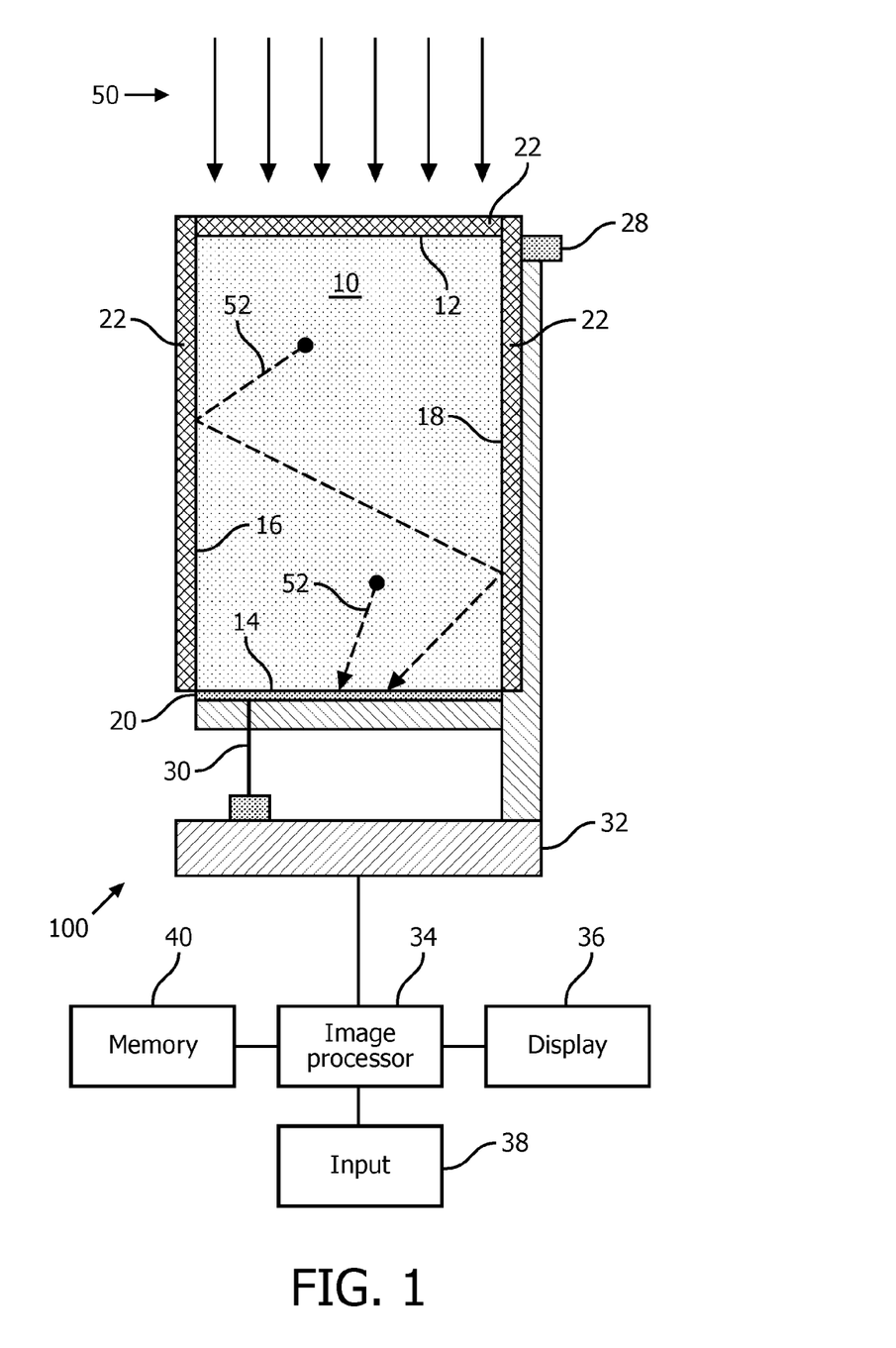
FIG. 1 is a schematic cross-sectional view of an x-ray detector unit 100, not drawn to scale.

FIG. 1 illustrates a first, exemplary embodiment of a unit 100 which detects incoming high energy radiation 50. The radiation detector unit 100 may be used, for example, in a computed tomography (CT) imaging apparatus. CT is an imaging modality used in many different contexts, including medical imaging. CT imaging systems typically employ an x-ray source (not shown) to generate x-rays 50 that traverse an examination region. A subject arranged in the examination region interacts with and absorbs a portion of the traversing x-rays 50. An array of x-ray radiation detectors 100 is arranged opposite the x-ray source to detect and measure intensities of the transmitted x-rays 50. The radiation detector array typically includes several detectors 100, wherein each detector 100 corresponds to one imaging pixel.

In an alternative example, the radiation detector unit 100 may be used in a positron emission tomography (PET) imaging apparatus. PET is an imaging modality used in many different contexts, including medical imaging. In PET, the subject to be imaged typically ingests a radiopharmaceutical which is configured to travel to an area of the subject to be imaged. The radiopharmaceutical emits gamma rays 50 which travel through and out of the subject to be detected by an array of gamma ray radiation detectors 100 arranged around the subject to detect and measure intensities of the emitted gamma rays 50. The radiation detector array typically includes several detectors 100, wherein each detector 100 corresponds to one imaging pixel.

Regardless of the particular imaging apparatus, the radiation detector 100 operates in substantially the same manner. The radiation detector 100 interacts with the incoming radiation 50 to produce electronic signals representative of the intensity and spectrum of radiation 50 received by the detector 100. The electronic signals may then be electronically processed to produce a two-dimensional or three-dimensional image of the subject under investigation. FIG. 1 is schematic in nature, meant principally for illustration and not as an exact depiction to scale of the elements shown. Therefore, the dimensions of a given element in relation to the dimensions of other elements as shown in the Figure do not necessarily reflect such relative dimensions as one would find in an actual radiation detector unit. For example, in an actual radiation detector unit, the reflector material 22 would be much thinner in relation to the size of the scintillator 10 than illustrated in the Figure.

The radiation detector unit 100 includes a scintillating luminescent composition 10 which, from the perspective of the view in FIG. 1, has a top face 12, a bottom face 14, and four side faces. Only two side faces 16 and 18 are shown in the Figure. The relative terms "top", "bottom" and "side" have meaning only from the perspective of FIG. 1. They do not have any functional significance in the operation of the detector 100. Thus, in particular applications, the detector 100 may be placed in an imaging apparatus such that the face 12 is actually a bottom face.

The x-ray detector unit 100 functions to harness the incoming high energy radiation 50 impinging upon the top face 12 and produce an electric signal which is representative of the amount or total energy of detected radiation 50. The first step in this process is performed by the scintillator 10, which acts as a transducer by absorbing the energy of the incoming high energy radiation 50 and converting that energy to secondary photons 52. The amount of secondary photons 52 produced by the scintillator 10 is thus representative of the incoming radiation energy absorbed within a given reading time period. Many different scintillators 10 are known in the art, and various scintillator 10 embodiments are discussed further below. The demands of a particular application may render one or more scintillator(s) 10 particularly suitable or particularly unsuitable for that application.

The x-ray detector unit 100 includes a photodetector 20 optically coupled to the bottom face 14 of the scintillator 10. Such optical coupling may be achieved by a direct contact, or with intervening elements such as for example filters, transparent or semi-transparent layers, transparent or semi-transparent adhesive, light guides, and the like. The photodetector 20 absorbs the energy of the secondary photons 52 produced by the scintillator 10 and converts that energy to an electrical signal. The electrical signal produced by the photodetector 20 is representative of the amount of secondary photons 52 impinging upon the photodetector 20, and is thus also representative of the radiation 50 flux entering the detector 100. Photodetectors include photomultipliers, photodiodes, and the like.

The scintillator 10 is covered with a reflector material 22 on each portion of its exterior other than the region where the scintillator 10 is optically coupled to the photodetector 20. The reflector material 22 reflects the secondary photons 52, but permits the high energy radiation photons 50 to pass through unaffected. Thus, the secondary photons 52 must exit the scintillator 10 (if they exit at all) through the photodetector 20 (except some small loss). Some secondary photons 52 will be self-absorbed by the scintillator 10 before they can reach the photodetector 20, and some may escape through or around the reflector material 22.

To help ensure that each radiation detector unit 100 counts only the radiation 50 which impinges upon the top face 12 of that unit 100, a radiation shielding or reflecting material 28 is placed in the spaces between the top faces 12 of adjacent units 100. For example, common x-ray shielding materials 28 include lead and tungsten, both of which substantially prevent the passage of any x-rays through the shield 28.

The photodetector 20 has one or more electrical leads 30 connecting the photodetector 20 to a circuit board 32. The circuit board 32 receives electrical signals from the photodetector 20 and passes them on to signal processing hardware and further on to an image processor 34. The image processor 34 processes electrical signals received from several different radiation detector units 100 to form an image of the subject under investigation according to a mathematical algorithm or algorithms. The image can be displayed on an associated display 36. A user input 38 may be provided for a user to control the image processor 34. The image processor 34 may store related imaging data and other data in a memory 40.

In yet another example, the luminescent compositions of the present disclosure may be used as an x-ray intensifier screen (not shown). In such embodiments, the luminescent composition is typically in a powdered form, rather than the ceramic or single crystal form of the scintillator 10 shown in FIG. 1.

The present disclosure particularly pertains to a luminescent composition scintillator having a host matrix which incorporates $Ce^{3+}$ as an activator. In some embodiments, for example, the $Ce^{3+}$ may comprise from 0.01% to 10% by atomic number within the host matrix. The $Ce^{3+}$ dopant shows luminescence in the ultraviolet range due to its spin- and parity-allowed $[Xe]5d^1$-$[Xe]4f^1$ transition. The luminescent compositions of the present disclosure may include one or more other doping agents in addition to the $Ce^{3+}$. These co-activators may include, for example, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$. Typical examples of a suitable host lattice include fluorides, sulphates, and phosphates, in particular:

$A(Y_{1-x-y}Lu_xLa_y)F_4$,
$A(Y_{1-x-y}Lu_xLa_y)_3F_{10}$,
$BaCa(Y_{1-x-y}Lu_xLa_y)_2F_{10}$, and
$Ba(Y_{1-x-y}Lu_xLa_y)_2F_8$, wherein A=Li, Na, K, Rb, Cs, or solid solutions thereof. Also, $0 \le x \le 1$ and $0 \le y \le 1$, with $x+y \le 1$.

The present disclosure also concerns the application of one or several of these luminescent compositions as a ceramic or single crystalline converter for CT imaging scanners, or PET or SPECT imaging scanners. This disclosure further concerns the application of one or several of these luminescent compositions in a luminescent powder layer for x-ray intensifying screens. The following table gives an overview of some representative example luminescent compositions:

TABLE 1

Density, Peak Emission, and Decay Time of Luminescent Compositions.

| Example No. | Chemical Composition | Density [g/cm³] | Emission maximum [nm] | Decay time 1/e [ns] |
|---|---|---|---|---|
| 1 | KYF$_4$:Ce | 3.53 | 327 | 31 |
| 2 | KY$_3$F$_{10}$:Ce | 4.27 | 377 | 45 |
| 3 | KLaF$_4$:Ce | 4.46 | 317 | 26 |
| 4 | KLuF$_4$:Ce | 4.80 | 312 | 29 |
| 5 | NaYF$_4$:Ce | 4.30 | 295 | 23 |
| 6 | NaLuF$_4$:Ce | 5.70 | 310 | 33 |
| 7 | RbLaF$_4$:Ce | 4.94 | 310 | 26 |
| 8 | BaYF$_5$:Ce | 5.25 | 330 | 41 |
| 9 | NaLaF$_4$:Ce | 4.66 | | |
| 10 | KLu$_3$F$_{10}$:Ce | 6.78 | | |
| 11 | CsLaF$_4$:Ce | | | |
| 12 | BaY$_2$F$_8$:Ce | 5.02 | | |
| 13 | Ba$_4$Y$_3$F$_{17}$:Ce | 5.24 | | |
| 14 | BaLu$_2$F$_8$:Ce | 6.98 | | |
| 15 | BaCaLu$_2$F$_{10}$:Ce | 6.54 | | |

Such materials can result in one or more of several advantages. These advantages can include lower production costs due to less material being required, a higher imaging resolution, and a shorter imaging time.

The luminescent compositions of the present disclosure may further include a diffusion barrier which coats the particles, the ceramic, or the single crystal of the composition. The diffusion barrier material operates to substantially prevent diffusion of $H_2O$, $CO_2$ and volatile organic compounds across the diffusion barrier. This enhances the stability of the luminescent composition.

The luminescent compositions of the present disclosure can be produced and used in the same manner as conventional luminescent compositions, as known by one of ordinary skill in the art.

The following working examples are provided to more thoroughly describe the luminescent compositions of the present disclosure.

EXAMPLE 1

KYF$_4$:Ce(1%) was prepared and evaluated. Initially, the first three ingredients of the following table were thoroughly blended together in an agate mortar:

| Ingredient | Amount |
|---|---|
| KF | 0.852 g (14.7 mmol) |
| YF$_3$ | 2.119 g (14.5 mmol) |
| CeF$_3$ | 0.029 g (0.18 mmol) |
| KBF$_4$ | 0.030 g (1 wt-%) |

KBF$_4$ was then added to the initial three ingredient blend, in the amount identified in the table, and the resulting mixture was milled again to form a final blend. The final blend was filled into a glassy-carbon crucible and calcined at 650° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 2:
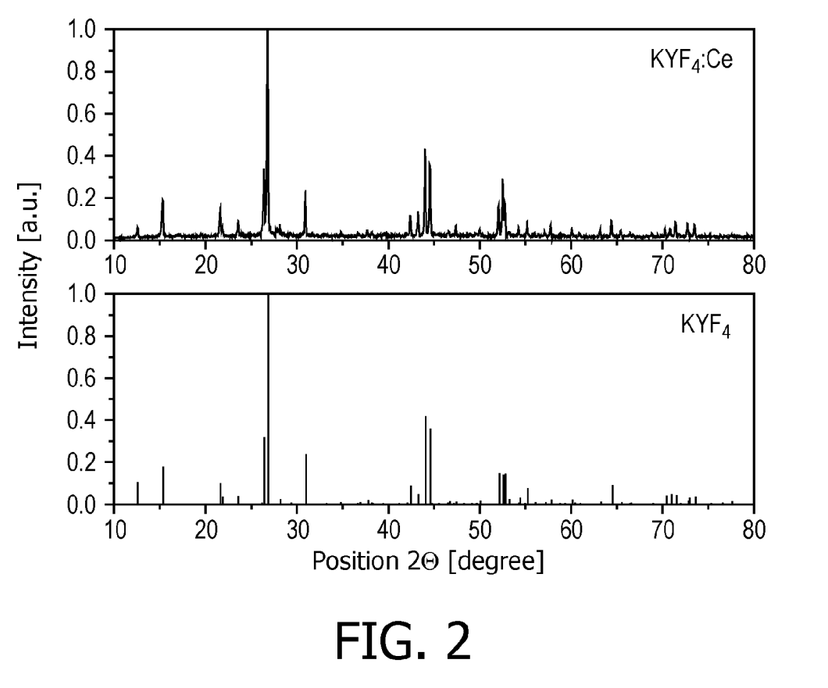
FIG. 2 shows the x-ray diffraction pattern of $KYF_4$:Ce ($\rho$=3.53 g/cm³), versus an un-doped $KYF_4$ reference.

FIG. 2 shows the x-ray diffraction pattern of the resulting KYF$_4$:Ce ($\rho$=3.53 g/cm³), versus an un-doped KYF$_4$ reference.

Figure 3:
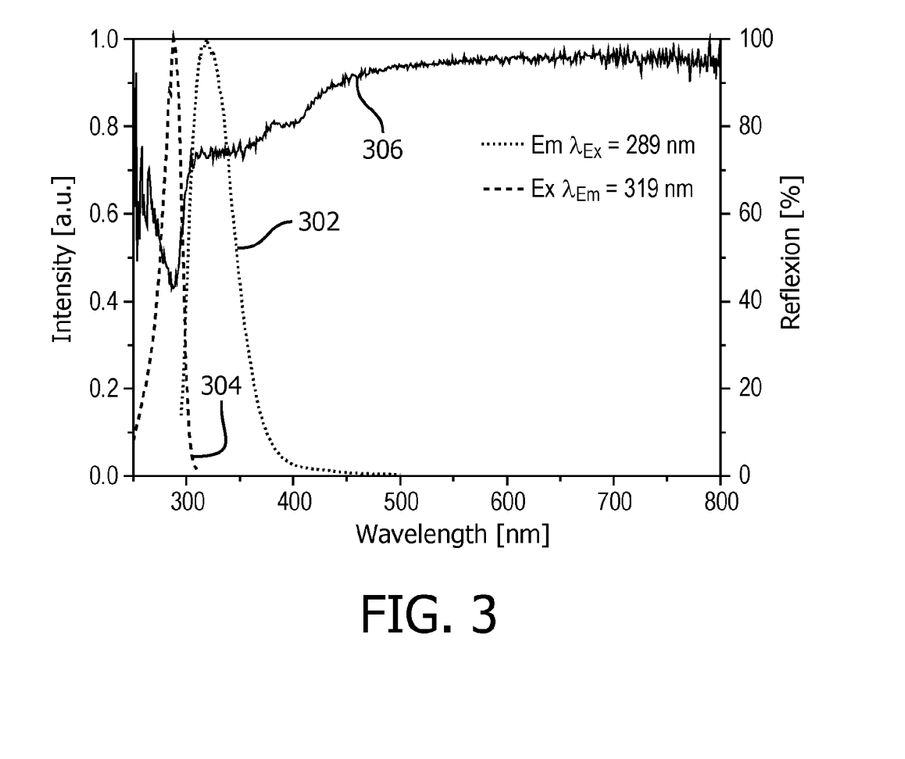
FIG. 3 shows the emission 302, excitation 304, and reflection 306 spectra of $KYF_4$:Ce.

FIG. 3 shows the emission 302, excitation 304, and reflection 306 spectra of the resulting KYF$_4$:Ce.

Figure 4:
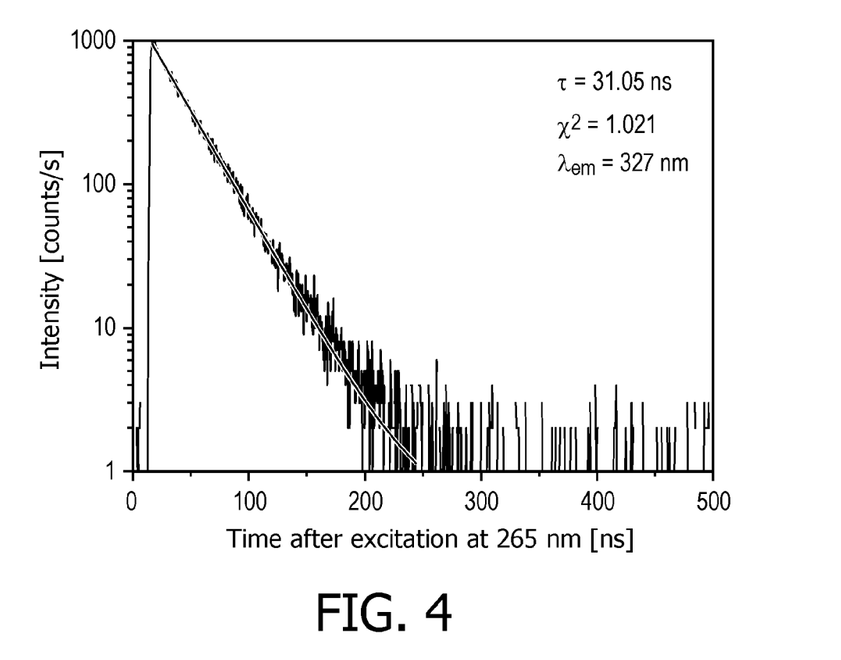
FIG. 4 shows the decay curve of $KYF_4$:Ce under 265 nm excitation (4f-5d) monitored at 327 nm.

FIG. 4 shows the decay curve of the resulting KYF$_4$:Ce under 265 nm excitation (4f-5d) monitored at 327 nm.

EXAMPLE 2

KY$_3$F$_{10}$:Ce(1%) was prepared and evaluated. Initially, the first three ingredients of the following table were thoroughly blended together in an agate mortar:

| Ingredient | Amount |
|---|---|
| KF | 0.350 g (6.0 mmol) |
| YF$_3$ | 2.614 g (17.9 mmol) |
| CeF$_3$ | 0.036 g (0.23 mmol) |
| KBF$_4$ | 0.030 g (1 wt-%) |

KBF$_4$ was then added to the initial three ingredient blend, in the amount identified in the table, and the resulting mixture was milled again to form a final blend. The final blend was filled into a glassy-carbon crucible and calcined at 650° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 5:
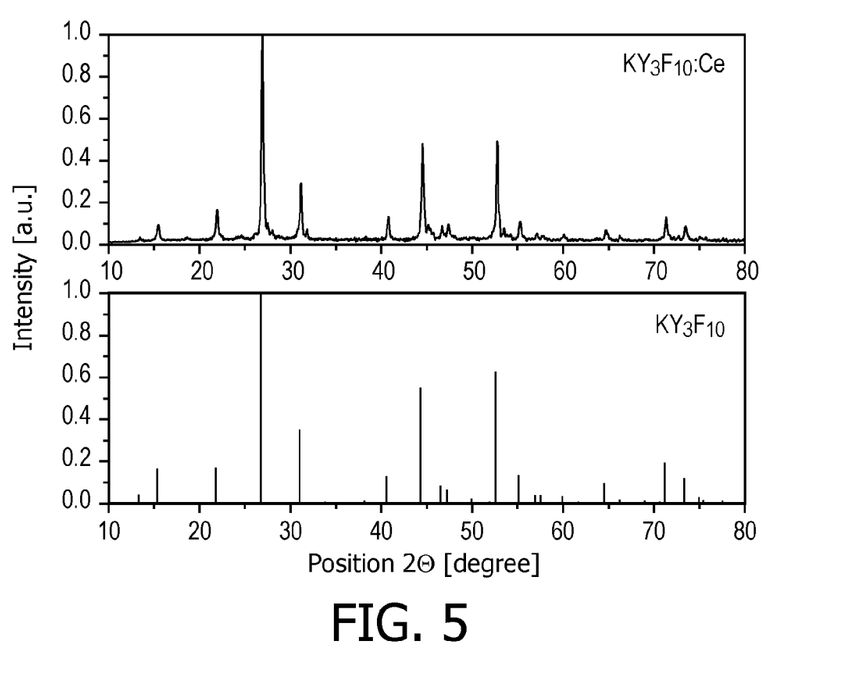
FIG. 5 shows the x-ray diffraction pattern of $KY_3F_{10}$:Ce ($\rho$=4.27 g/cm³), versus an un-doped $KY_3F_{10}$ reference.

FIG. 5 shows the x-ray diffraction pattern of the resulting KY$_3$F$_{10}$:Ce ($\rho$=4.27 g/cm³), versus an un-doped KY$_3$F$_{10}$ reference.

Figure 6:
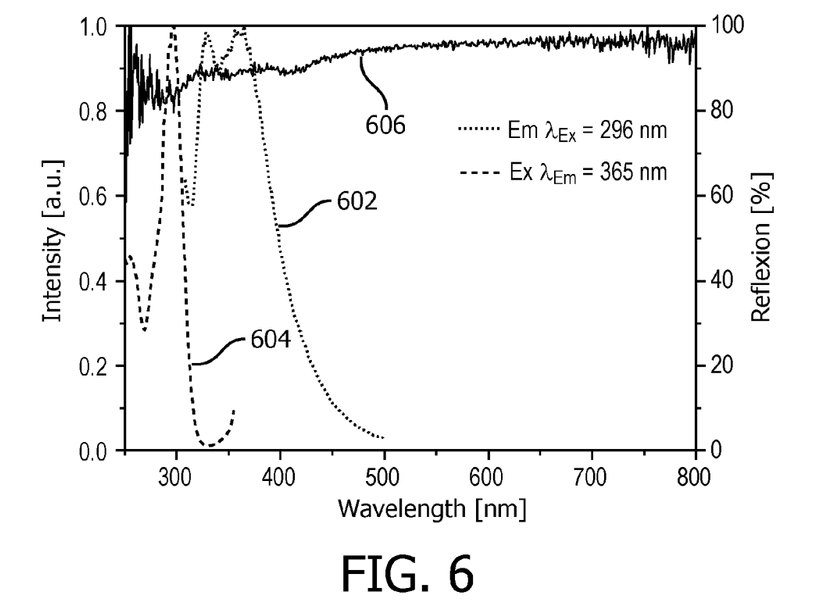
FIG. 6 shows the emission 602, excitation 604, and reflection 606 spectra of $KY_3F_{10}$:Ce.

FIG. 6 shows the emission 602, excitation 604, and reflection 606 spectra of the resulting KY$_3$F$_{10}$:Ce. The band at 327 nm is due to an impurity of KYF$_4$:Ce.

Figure 7:
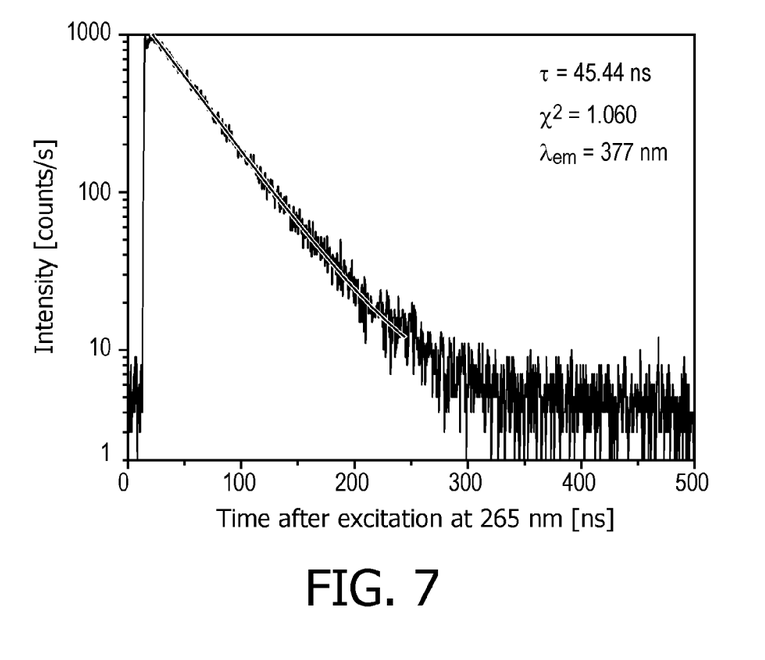
FIG. 7 shows the decay curve of $KY_3F_{10}$:Ce under 265 nm excitation (4f-5d) monitored at 377 nm.

FIG. 7 shows the decay curve of the resulting KY$_3$F$_{10}$:Ce under 265 nm excitation (4f-5d) monitored at 377 nm.

EXAMPLE 3

KLaF$_4$:Ce(1%) was prepared and evaluated. Initially, the first three ingredients of the following table were thoroughly blended together in an agate mortar:

| Ingredient | Amount |
| --- | --- |
| KF | 0.686 g (11.8 mmol) |
| LaF$_3$ | 2.291 g (11.7 mmol) |
| CeF$_3$ | 0.029 g (0.18 mmol) |
| KBF$_4$ | 0.030 g (1 wt-%) |

KBF$_4$ was then added to the initial three ingredient blend, in the amount identified in the table, and the resulting mixture was milled again to form a final blend. The final blend was filled into a glassy-carbon crucible and calcined at 650° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 8:
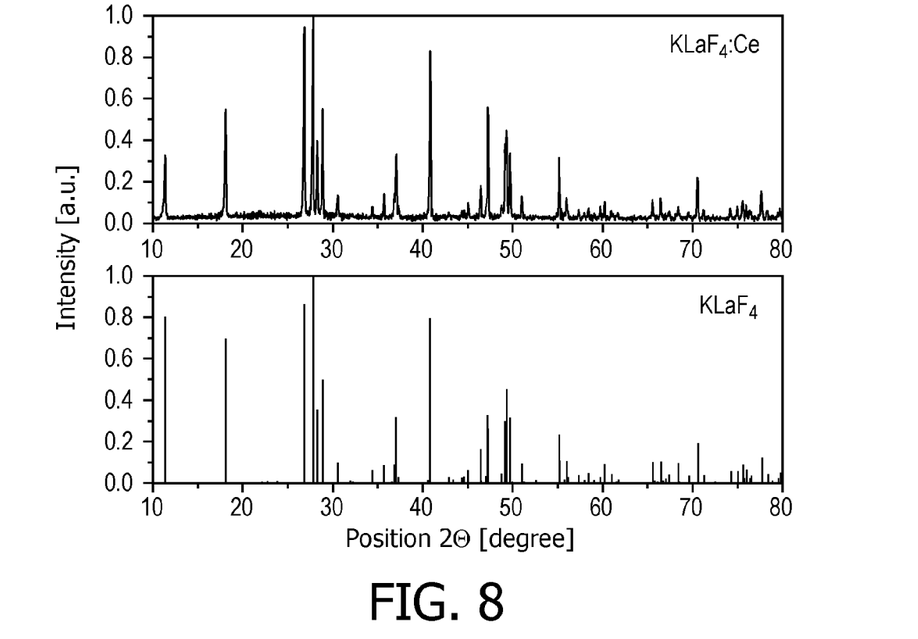
FIG. 8 shows the x-ray diffraction pattern of $KLaF_4$:Ce ($\rho$=4.46 g/cm³), versus an un-doped $KLaF_4$ reference.

FIG. 8 shows the x-ray diffraction pattern of the resulting KLaF$_4$:Ce ($\rho$=4.46 g/cm$^3$), versus an un-doped KLaF$_4$ reference.

Figure 9:
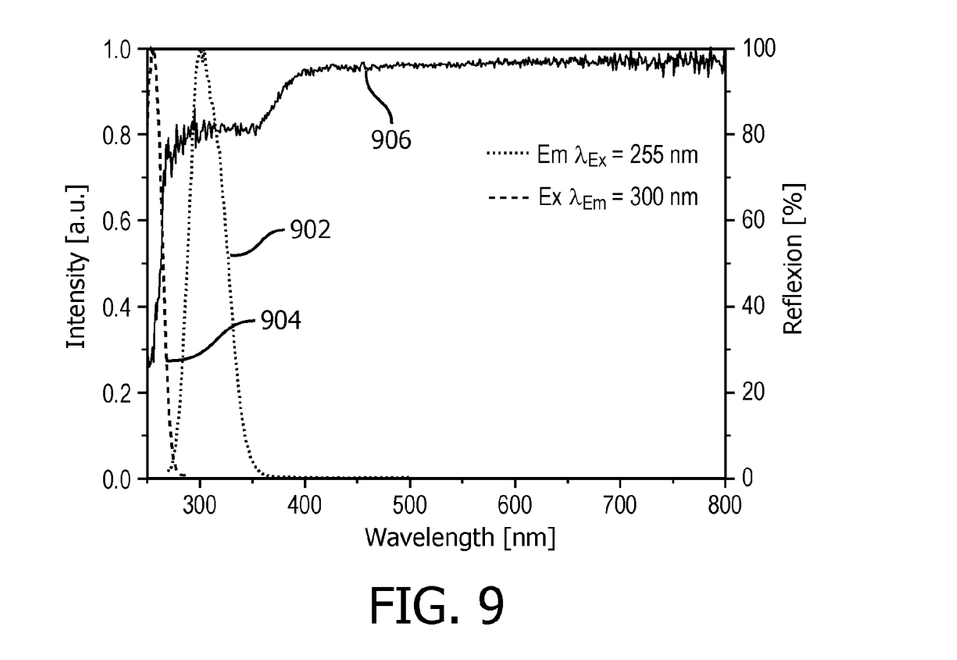
FIG. 9 shows the emission 902, excitation 904, and reflection 906 spectra of $KLaF_4$:Ce.

FIG. 9 shows the emission 902, excitation 904, and reflection 906 spectra of the resulting KLaF$_4$:Ce.

Figure 10:
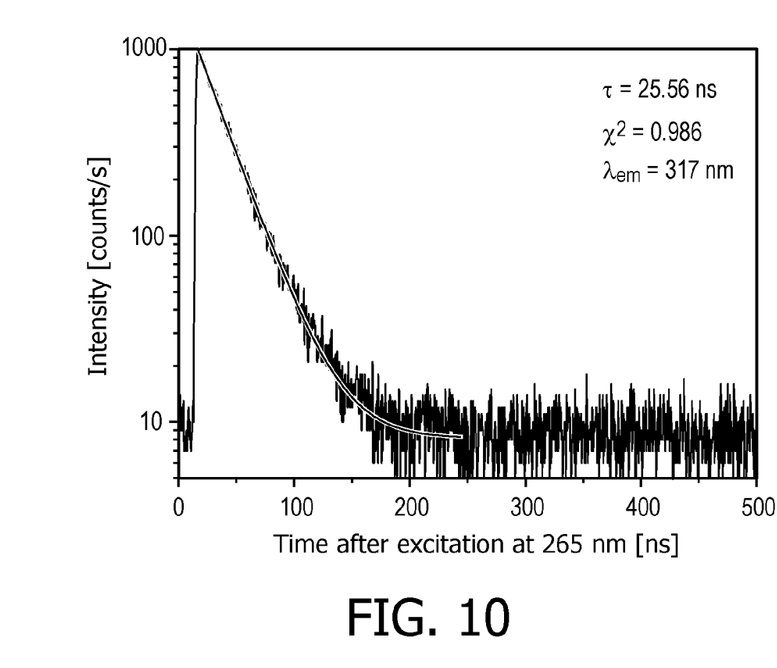
FIG. 10 shows the decay curve of $KLaF_4$:Ce under 265 nm excitation (4f-5d) monitored at 317 nm.

FIG. 10 shows the decay curve of the resulting KLaF$_4$:Ce under 265 nm excitation (4f-5d) monitored at 317 nm.

EXAMPLE 4

KLuF$_4$:Ce(1%) was prepared and evaluated. Initially, the first three ingredients of the following table were thoroughly blended together in an agate mortar:

| Ingredient | Amount |
| --- | --- |
| KF | 0.602 g (10.4 mmol) |
| LuF$_3$ | 2.378 g (10.3 mmol) |
| CeF$_3$ | 0.020 g (0.13 mmol) |
| KBF$_4$ | 0.030 g (1 wt-%) |

KBF$_4$ was then added to the initial three ingredient blend, in the amount identified in the table, and the resulting mixture was milled again to form a final blend. The final blend was filled into a glassy-carbon crucible and calcined at 650° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 11:
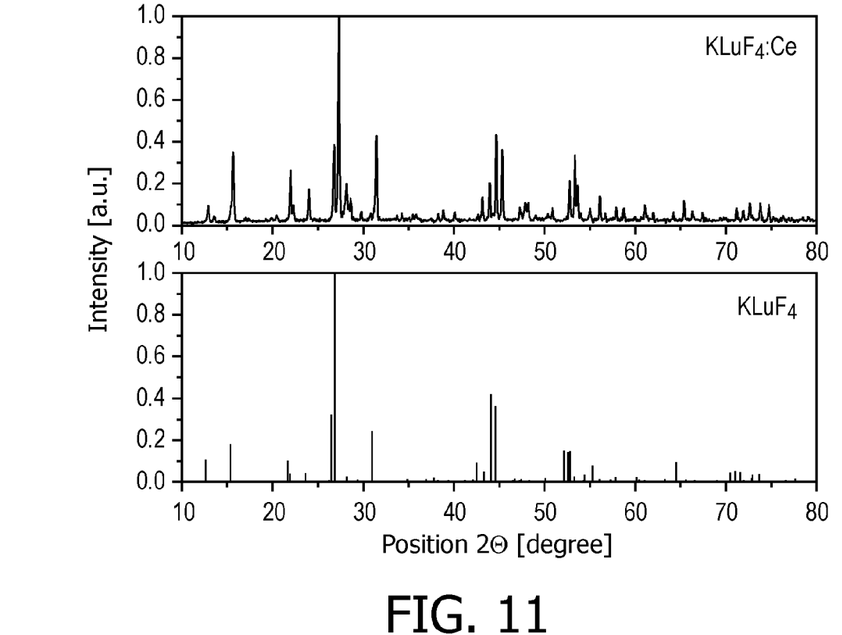
FIG. 11 shows the x-ray diffraction pattern of $KLuF_4$:Ce ($\rho$=4.80 g/cm³), versus an un-doped $KLuF_4$ reference.

FIG. 11 shows the x-ray diffraction pattern of the resulting KLuF$_4$:Ce ($\rho$=4.80 g/cm$^3$), versus an un-doped KYF$_4$ reference. X-ray diffraction pattern data for un-doped KLuF$_4$ was not readily available to the inventors at the time this disclosure was prepared.

Figure 12:
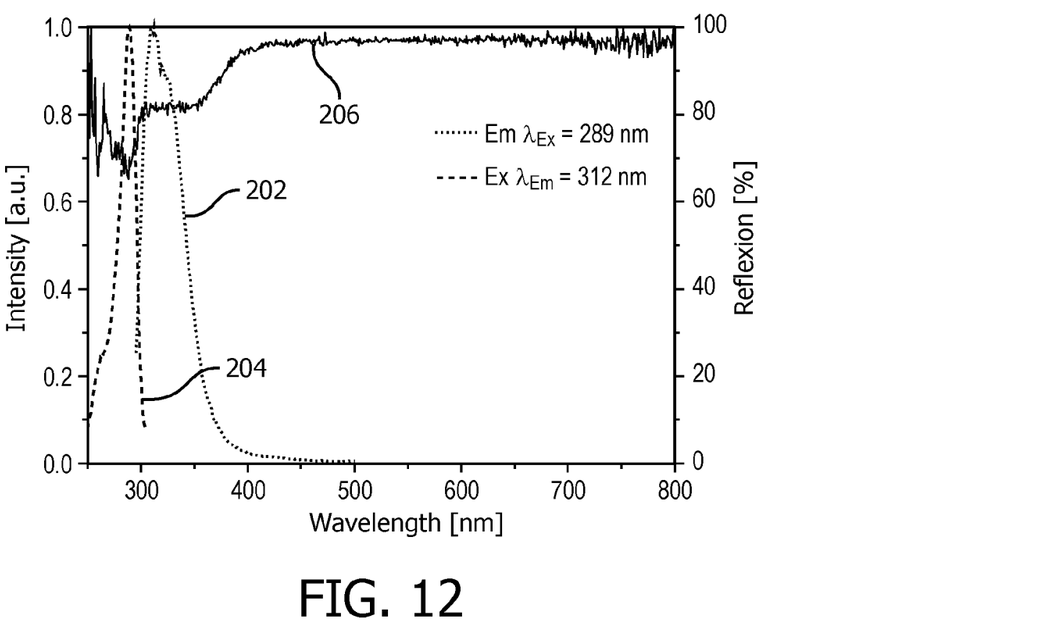
FIG. 12 shows the emission 202, excitation 204, and reflection 206 spectra of $KLuF_4$:Ce.

FIG. 12 shows the emission 202, excitation 204, and reflection 206 spectra of the resulting KLuF$_4$:Ce.

Figure 13:
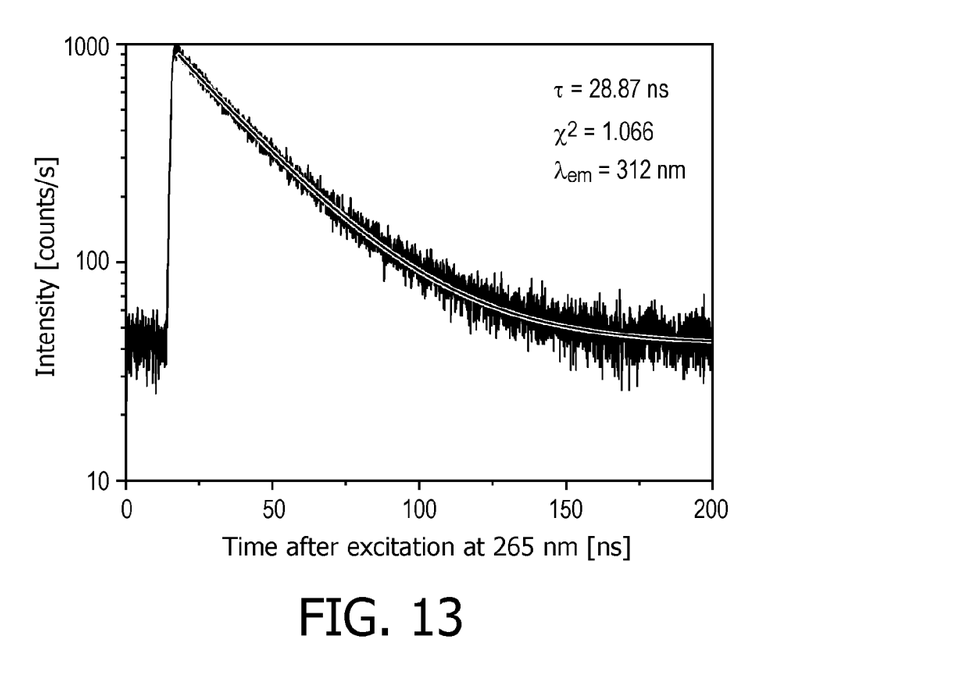
FIG. 13 shows the decay curve of $KLuF_4$:Ce under 265 nm excitation (4f-5d) monitored at 312 nm.

FIG. 13 shows the decay curve of the resulting KLuF$_4$:Ce under 265 nm excitation (4f-5d) monitored at 312 nm.

EXAMPLE 5

NaYF$_4$:Ce(1%) was prepared and evaluated. Initially, the first three ingredients of the following table were thoroughly blended together in an agate mortar:

| Ingredient | Amount |
| --- | --- |
| NaF | 0.669 g (15.9 mmol) |
| YF$_3$ | 2.300 g (15.8 mmol) |
| CeF$_3$ | 0.031 g (0.19 mmol) |
| NaBF$_4$ | 0.030 g (1 wt-%) |

NaBF$_4$ was then added to the initial three ingredient blend, in the amount identified in the table, and the resulting mixture was milled again to form a final blend. The final blend was filled into a glassy-carbon crucible and calcined at 700° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 14:
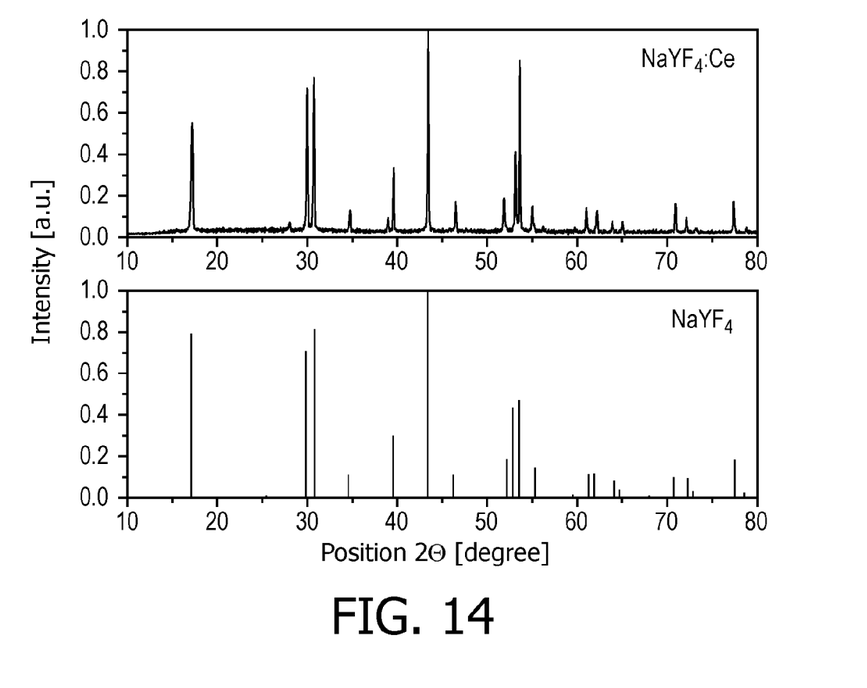
FIG. 14 shows the x-ray diffraction pattern of $NaYF_4$:Ce ($\rho$=4.30 g/cm³), versus an un-doped $NaYF_4$ reference.

FIG. 14 shows the x-ray diffraction pattern of the resulting NaYF$_4$:Ce ($\rho$=4.30 g/cm$^3$), versus an un-doped NaYF$_4$ reference.

Figure 15:
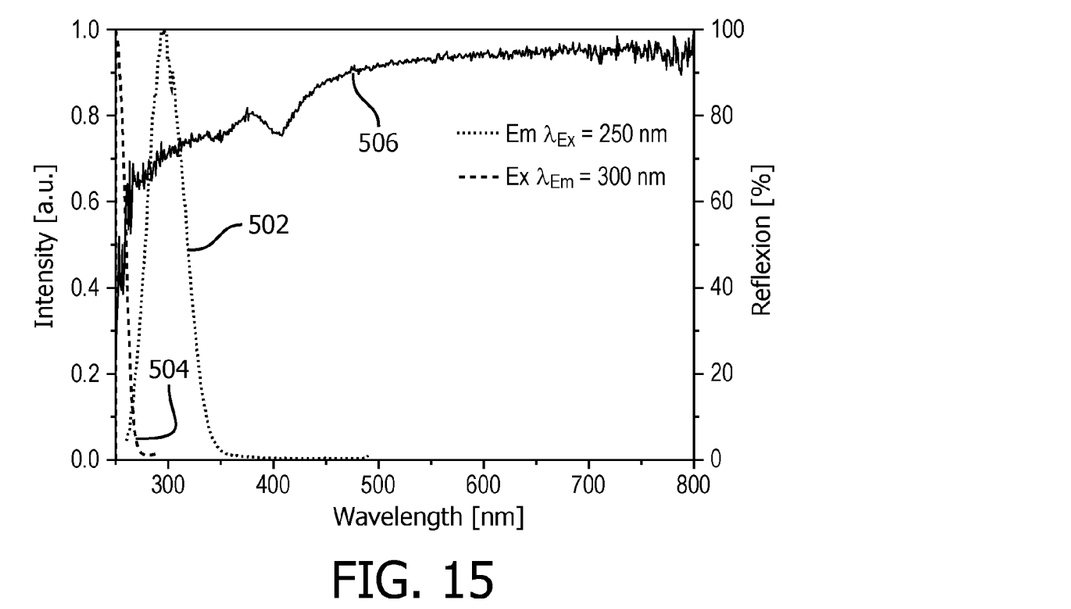
FIG. 15 shows the emission 502, excitation 504, and reflection 506 spectra of $NaYF_4$:Ce.

FIG. 15 shows the emission 502, excitation 504, and reflection 506 spectra of the resulting NaYF$_4$:Ce.

Figure 16:
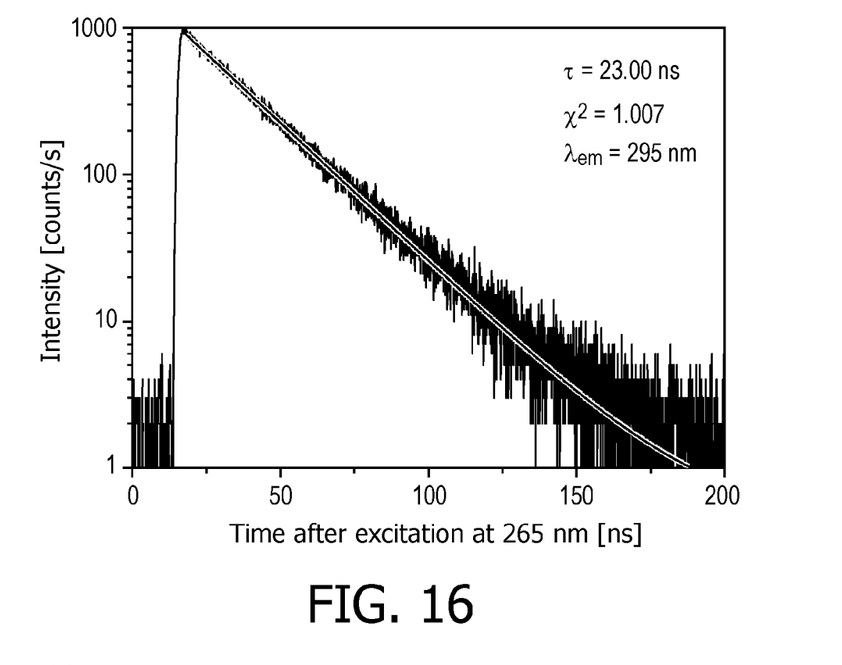
FIG. 16 shows the decay curve of $NaYF_4$:Ce under 265 nm excitation (4f-5d) monitored at 295 nm.

FIG. 16 shows the decay curve of the resulting NaYF$_4$:Ce under 265 nm excitation (4f-5d) monitored at 295 nm.

EXAMPLE 6

NaLuF$_4$:Ce(1%) was prepared and evaluated. Initially, the first three ingredients of the following table were thoroughly blended together in an agate mortar:

| Ingredient | Amount |
| --- | --- |
| NaF | 0.460 g (11.0 mmol) |
| LuF$_3$ | 2.518 g (10.9 mmol) |
| CeF$_3$ | 0.022 g (0.14 mmol) |
| NaBF$_4$ | 0.030 g (1 wt-%) |

NaBF$_4$ was then added to the initial three ingredient blend, in the amount identified in the table, and the resulting mixture was milled again to form a final blend. The final blend was filled into a glassy-carbon crucible and calcined at 700° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 17:
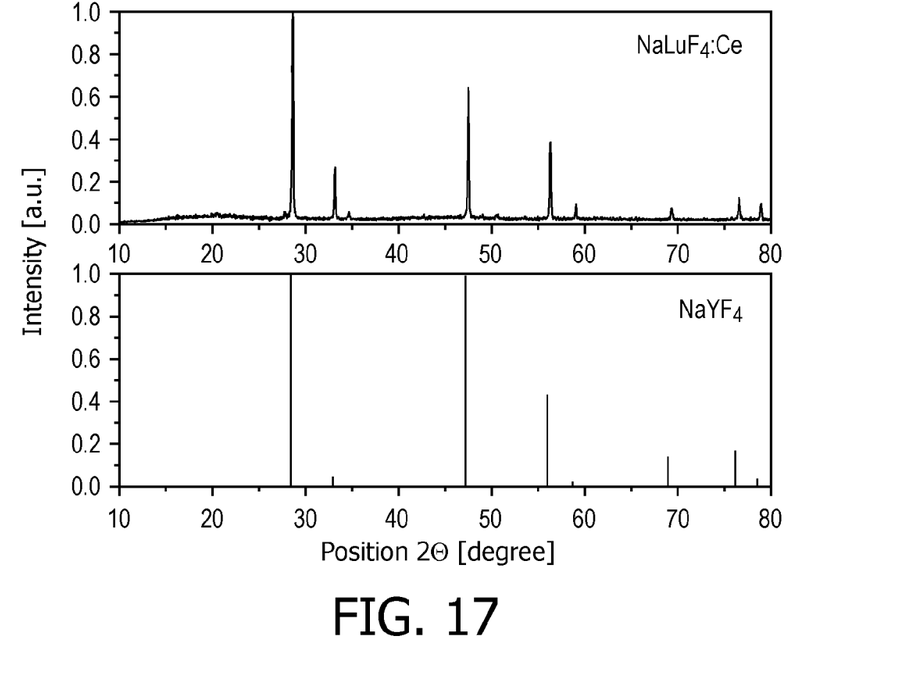
FIG. 17 shows the x-ray diffraction pattern of NaLuF$_4$:Ce ($\rho$=5.70 g/cm$^3$), versus an un-doped NaYF$_4$ reference.

FIG. 17 shows the x-ray diffraction pattern of the resulting NaLuF$_4$:Ce ($\rho$=5.70 g/cm$^3$), versus an un-doped NaYF$_4$ reference. X-ray diffraction pattern data for un-doped NaLuF$_4$ was not readily available to the inventors at the time this disclosure was prepared.

Figure 18:
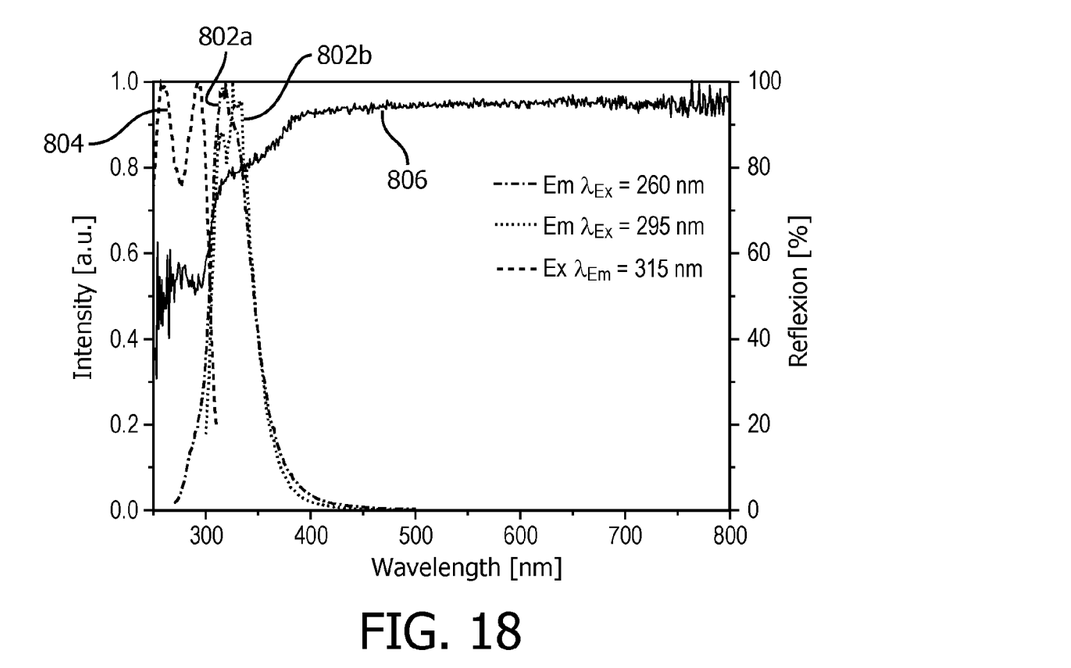
FIG. 18 shows two emission spectra 802a and 802b, the excitation spectrum 804, and the reflection 806 spectrum of NaLuF$_4$:Ce.

FIG. 18 shows a first emission spectrum 802a under 260 nm excitation light, a second emission spectrum 802b under 295 nm excitation light, the excitation spectrum 804, and the reflection spectrum 806 of the resulting NaLuF$_4$:Ce.

Figure 19:
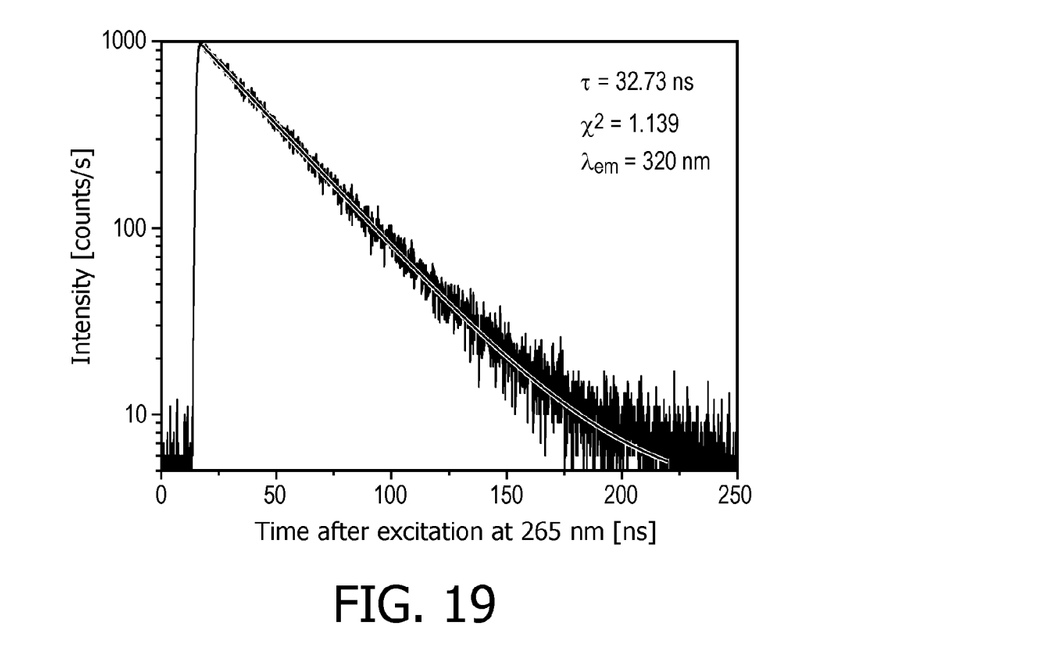
FIG. 19 shows the decay curve of NaLuF$_4$:Ce under 265 nm excitation (4f-5d) monitored at 320 nm.

FIG. 19 shows the decay curve of the resulting NaLuF$_4$:Ce under 265 nm excitation (4f-5d) monitored at 320 nm.

EXAMPLE 7

RbLaF$_4$:Ce(1%) was prepared and evaluated. Initially, the first three ingredients of the following table were thoroughly blended together in an agate mortar:

| Ingredient | Amount |
| --- | --- |
| RbF | 1.043 g (10.0 mmol) |
| LaF$_3$ | 1.937 g (9.9 mmol) |
| CeF$_3$ | 0.020 g (0.13 mmol) |
| RbBF$_4$ | 0.030 g (1 wt-%) |

RbBF$_4$ was then added to the initial three ingredient blend, in the amount identified in the table, and the resulting mixture was milled again to form a final blend. The final blend was filled into a glassy-carbon crucible and calcined at 700° C. for 6 hours. A small sample of AlF$_3$ was used as a water scavenger in the tube furnace to trap any water remaining in the stream of dried Nitrogen. After the firing step, samples were powderized by grinding in an agate mortar.

Figure 20:
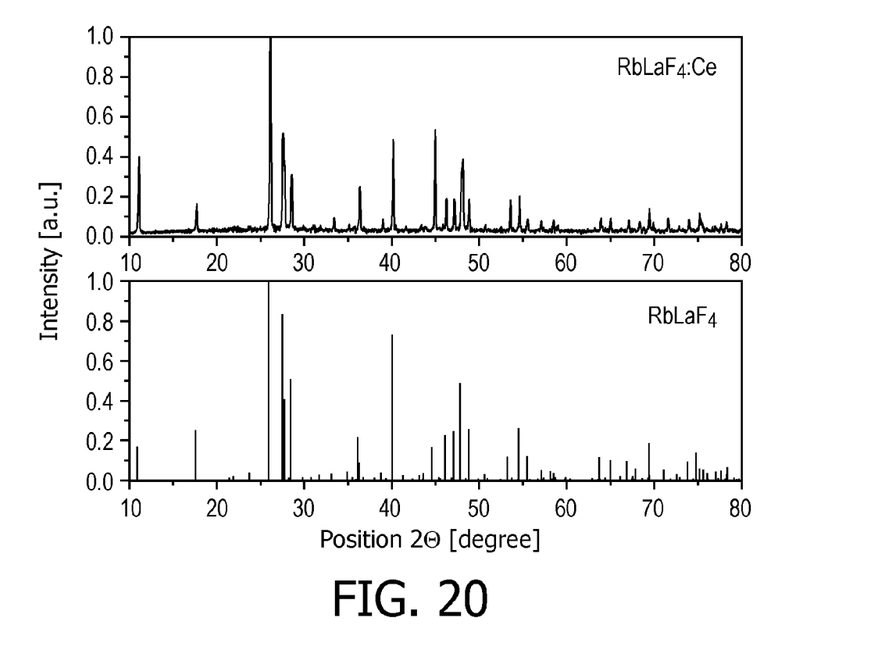
FIG. 20 shows the x-ray diffraction pattern of RbLaF$_4$:Ce ($\rho$=4.94 g/cm$^3$), versus an un-doped RbLaF$_4$ reference.

FIG. 20 shows the x-ray diffraction pattern of the resulting RbLaF$_4$:Ce ($\rho$=4.94 g/cm$^3$), versus an un-doped RbLaF$_4$ reference.

Figure 21:
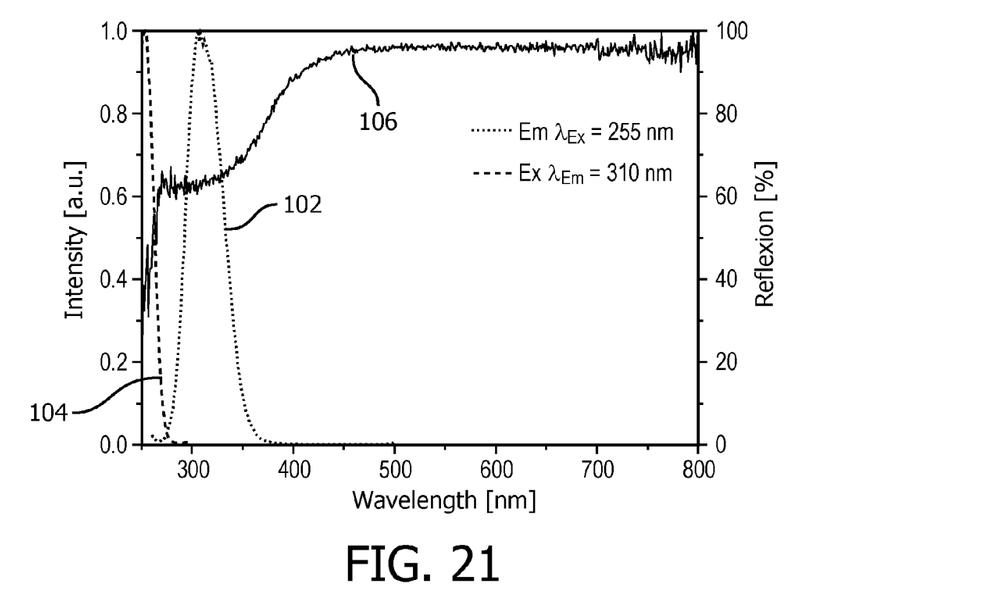
FIG. 21 shows the emission 102, excitation 104, and reflection 106 spectra of RbLaF$_4$:Ce.

FIG. 21 shows the emission 102, excitation 104, and reflection 106 spectra of the resulting RbLaF$_4$:Ce.

Figure 22:
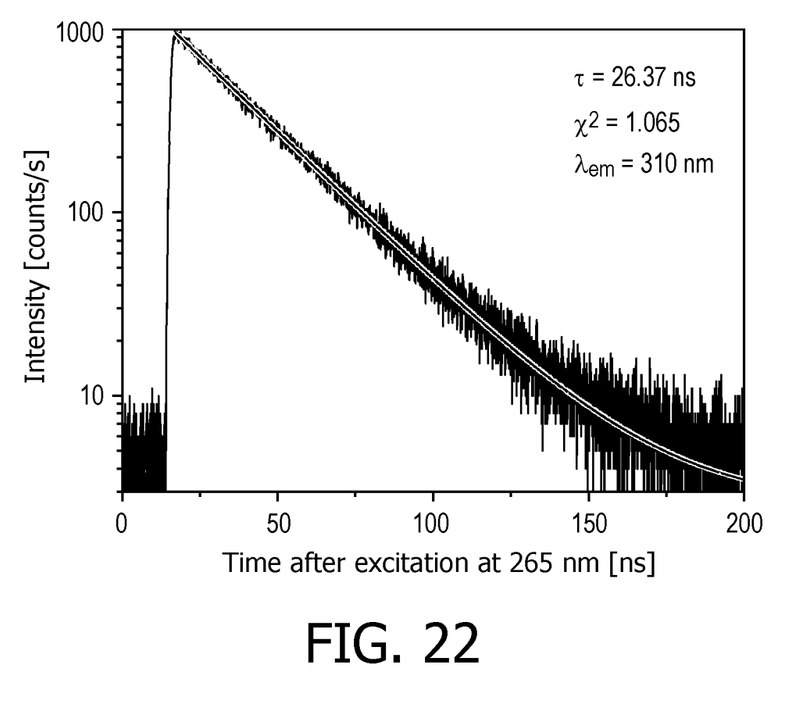
FIG. 22 shows the decay curve of RbLaF$_4$:Ce under 265 nm excitation (4f-5d) monitored at 310 nm.

FIG. 22 shows the decay curve of the resulting RbLaF$_4$:Ce under 265 nm excitation (4f-5d) monitored at 310 nm.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various chemical compositions, components and arrangements, combinations and sub-combinations of the elements of the disclosed embodiments.

Having thus described the preferred embodiments, the invention is now claimed to be:

1. A scintillator material comprising a host lattice activated by Ce$^{3+}$, wherein the host lattice is selected from the group consisting of:
   A(Y$_{1-x-y}$Lu$_x$La$_y$)F$_4$,
   A(Y$_{1-x-y}$Lu$_x$La$_y$)$_3$F$_{10}$,
   BaCa(Y$_{1-x-y}$Lu$_x$La$_y$)$_2$F$_{10}$, and
   Ba(Y$_{1-x-y}$Lu$_x$La$_y$)$_2$F$_8$,
   and further wherein A is selected from the group consisting of Li, Na, K, Rb, Cs, and a solid solution comprising a mixture of two or more of those elements, and wherein 0<x<1 and 0<y<1.

2. The scintillator material of claim 1, wherein the material is activated by 0.01% to 10% of Ce$^{3+}$.

3. The scintillator material of claim 1, wherein the material is co-activated by at least one element selected from the group consisting of Pr$^{3+}$, Nd$^{3+}$, Sm$^{3+}$, Eu$^{3+}$, Gd$^{3+}$, Tb$^{3+}$, Dy$^{3+}$, Ho$^{3+}$, Er$^{3+}$, Tm$^{3+}$, and Yb$^{3+}$.

4. The scintillator material of claim 1, further comprising a diffusion barrier coating material which substantially prevents diffusion of H$_2$O, CO$_2$ and volatile organic compounds across the diffusion barrier.

5. A PET or SPECT imaging system comprising the scintillator material of claim 1.

6. A CT imaging system comprising the scintillator material of claim 1.

7. An imaging system including an x-ray converter film which comprises the scintillator material of claim 1.

8. A luminescent composition comprising a host matrix in combination with Ce$^{3+}$ as an activator, in which the emission band maximum of the Ce$^{3+}$ is equal to or below 400 nm, wherein the host matrix is selected from the group consisting of:
   A(Y$_{1-x-y}$Lu$_x$La$_y$)F$_4$,
   A(Y$_{1-x-y}$Lu$_x$La$_y$)$_3$F$_{10}$,
   BaCa(Y$_{1-x-y}$Lu$_x$La$_y$)$_2$F$_{10}$, and
   Ba(Y$_{1-x-y}$Lu$_x$La$_y$)$_2$F$_8$,
   and further wherein A is selected from the group consisting of Li, Na, K, Rb, Cs, and a solid solution comprising a mixture of two or more of those elements, and wherein 0<x<1 and 0<y<1.

9. The luminescent composition of claim 8, wherein the emission band maximum of the Ce$^{3+}$ is equal to or above 280 nm.

10. The luminescent composition of claim 8, wherein the composition is activated by 0.01% to 10% of Ce$^{3+}$.

11. The luminescent composition of claim 8, wherein the composition is co-activated by at least one element selected from the group consisting of Pr$^{3+}$, Nd$^{3+}$, Sm$^{3+}$, Eu$^{3+}$, Gd$^{3+}$, Tb$^{3+}$, Dy$^{3+}$, Ho$^{3+}$, Er$^{3+}$, Tm$^{3+}$, and Yb$^{3+}$.

12. The luminescent composition of claim 8, further comprising a diffusion barrier coating material which substantially prevents diffusion of H$_2$O, CO$_2$ and volatile organic compounds across the diffusion barrier.

13. An imaging system including an x-ray converter film which comprises the luminescent composition of claim 8.

14. A radiation detector including an x-ray converter film which comprises the luminescent composition of claim 8.

15. An imaging device comprising:
   at least one radiation source;
   at least one radiation detector including a scintillator material comprising a rigid host lattice activated by Ce$^{3+}$, wherein the host lattice is selected from the group consisting of:
   A(Y$_{1-x-y}$Lu$_x$La$_y$)F$_4$,
   A(Y$_{1-x-y}$Lu$_x$La$_y$)$_3$F$_{10}$,
   BaCa(Y$_{1-x-y}$Lu$_x$La$_y$)$_2$F$_{10}$, and
   Ba(Y$_{1-x-y}$Lu$_x$La$_y$)$_2$F$_8$,
   and further wherein A is selected from the group consisting of Li, Na, K, Rb, Cs, and a solid solution comprising a mixture of two or more of those elements, and
   wherein x is greater than 0 and less than one, and
      y is greater than 0 and less than one; and
   a photodetector optically coupled to the scintillator material.

16. The imaging device of claim 15, wherein the imaging device is a CT, PET, or SPECT imaging device.

* * * * *